(12) United States Patent
Takeuchi

(10) Patent No.: US 7,510,503 B2
(45) Date of Patent: Mar. 31, 2009

(54) CLUTCH FAILURE DETECTOR, AUTOMATIC CLUTCH SYSTEM AND STRADDLE-TYPE VEHICLE

(75) Inventor: Yoshihiko Takeuchi, Iwata (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 429 days.

(21) Appl. No.: 11/514,387

(22) Filed: Aug. 31, 2006

(65) Prior Publication Data
US 2007/0199755 A1 Aug. 30, 2007

(30) Foreign Application Priority Data
Feb. 24, 2006 (JP) .............................. 2006-048086

(51) Int. Cl.
*B60W 10/00* (2006.01)
(52) U.S. Cl. ........................................................ 477/87
(58) Field of Classification Search ............... 192/30 W, 192/84.6
See application file for complete search history.

(56) References Cited

U.S. PATENT DOCUMENTS

| | | | |
|---|---|---|---|
| 1,500,878 A | 7/1924 | Kruchten | |
| 4,829,221 A * | 5/1989 | Grunberg et al. | 318/587 |
| 5,121,649 A | 6/1992 | Randriazanamparany et al. | |
| 6,239,610 B1 * | 5/2001 | Knecht et al. | 324/772 |
| H2031 H | 6/2002 | Harrell et al. | |
| 6,481,554 B1 | 11/2002 | Ota | |
| 6,502,681 B1 | 1/2003 | Ota | |
| 6,589,132 B2 * | 7/2003 | Amisano et al. | 477/77 |
| 2004/0118652 A1 | 6/2004 | Muetzel et al. | |
| 2004/0231947 A1 * | 11/2004 | Baehr | 192/84.6 |
| 2006/0094567 A1 | 5/2006 | Kosugi et al. | |
| 2006/0124422 A1 | 6/2006 | Zenno | |
| 2006/0128525 A1 | 6/2006 | Zenno | |
| 2006/0128527 A1 | 6/2006 | Zenno et al. | |
| 2006/0160660 A1 | 7/2006 | Zenno et al. | |

(Continued)

FOREIGN PATENT DOCUMENTS

DE 4336445 4/1995

(Continued)

OTHER PUBLICATIONS

Co-Pending U.S. Appl. No. 11/514,386, filed Aug. 31, 2006. Title: Clutch Control Device and Vehicle.

(Continued)

*Primary Examiner*—Dirk Wright
(74) *Attorney, Agent, or Firm*—Knobbe, Martens, Olson & Bear LLP (57) ABSTRACT

A clutch failure detector is provided for detecting failure of an automatic clutch system. The clutch failure detector can include a current value detector and a determination device. Upon turning ON a main switch, an operation to disengage and engage a clutch can be performed by a clutch actuator, and a totalized value of current supplied to a clutch actuator can be calculated for a specific period of time while the clutch is in the process of engaging in the operation to disengage and engage the clutch. The totalized value can be compared with a preset threshold, and if a difference between the totalized value and the threshold is equal to or greater than a given value, it is determined that an automatic clutch system has a failure.

21 Claims, 9 Drawing Sheets

U.S. PATENT DOCUMENTS

| | | | |
|---|---|---|---|
| 2006/0169561 A1 | 8/2006 | Ooishi et al. | |
| 2006/0169562 A1 | 8/2006 | Kosugi | |
| 2006/0169569 A1 | 8/2006 | Ooishi et al. | |

FOREIGN PATENT DOCUMENTS

| | | |
|---|---|---|
| DE | 19709419 | 10/1997 |
| DE | 19853333 | 6/1999 |
| DE | 10107962 | 8/2002 |
| DE | 10327438 | 1/2004 |
| DE | 10304588 | 4/2004 |
| DE | 10253809 A1 | 5/2004 |
| DE | 10306934 | 9/2004 |
| DE | 10393681 | 10/2005 |
| EP | 0129417 | 6/1984 |
| EP | 0328362 | 8/1989 |
| EP | 0 490 730 A1 | 12/1991 |
| EP | 0590240 | 4/1994 |
| EP | 0635391 | 7/1994 |
| EP | 0887220 | 6/1998 |
| EP | 0987467 | 7/1999 |
| EP | 1122116 | 1/2001 |
| EP | 1342930 A2 | 3/2003 |
| EP | 1365176 | 5/2003 |
| EP | 1555461 | 10/2003 |
| EP | 1469236 | 4/2004 |
| EP | 1666772 | 8/2005 |
| GB | 2170571 | 1/1986 |
| JP | 43-11555 | 5/1968 |
| JP | 68-152938 | 9/1983 |
| JP | 61-024858 | 2/1986 |
| JP | 62-017631 | 1/1987 |
| JP | 62-80192 | 4/1987 |
| JP | 62-75414 | 5/1987 |
| JP | 62-110532 | 5/1987 |
| JP | 02-118269 | 5/1990 |
| JP | 03-172675 | 7/1991 |
| JP | 03-290030 | 12/1991 |
| JP | 4-266619 | 9/1992 |
| JP | 05-026065 | 2/1993 |
| JP | 05-039865 | 2/1993 |
| JP | 60-86631 | 12/1994 |
| JP | 08-061487 | 3/1996 |
| JP | 11-082710 | 3/1999 |
| JP | 3044498 | 3/2000 |
| JP | 2000-205411 | 7/2000 |
| JP | 2001-050389 | 2/2001 |
| JP | 2001-146930 | 5/2001 |
| JP | 2001-173685 | 6/2001 |
| JP | 2001-280493 | 10/2001 |
| JP | 2002-067741 | 3/2002 |
| JP | 2002-243034 | 8/2002 |
| JP | 2003-329064 | 11/2003 |
| JP | 2005-282784 | 10/2005 |
| JP | 2006-017221 | 1/2006 |
| WO | WO 91/10979 | 7/1991 |
| WO | WO 98/24008 | 6/1998 |
| WO | 02/25131 | 3/2002 |
| WO | 2004/005743 | 1/2004 |
| WO | WO 2004/094177 | 11/2004 |

OTHER PUBLICATIONS

Co-Pending U.S. Appl. No. 11/514,000, filed Aug. 31, 2006. Title: Automatic Shift Control Device and Vehicle.
Co-Pending U.S. Appl. No. 11/513,609, filed Aug. 31, 2006. Title: Automated Transmission Controller and Vehicle Including the Automated Transmission Controller.
Co-Pending U.S. Appl. No. 11/514,017, filed Aug. 31, 2006. Title: Automated Transmission Controller and Vehicle Including the Automated Transmission Controller.
Co-Pending U.S. Appl. No. 11/513,537, filed Aug. 31, 2006. Title: Automatic Gearshift Control Device and Vehicle.
Co-Pending U.S. Appl. No. 11/469,268, filed Aug. 31, 2006. Title: Clutch Actuator, Engine Unit, and Straddle Type Vehicle.
Co-Pending U.S. Appl. No. 11/469,310, filed Aug. 31, 2006. Title: Clutch Actuator, Engine Unit, and Straddle Type Vehicle.
Co-Pending U.S. Appl. No. 11/469,228, filed Aug. 31, 2006. Title: Clutch Actuator, Engine Unit, and Straddle Type Vehicle.
Co-Pending U.S. Appl. No. 11/469,252, filed Aug. 31, 2006. Title: Shift Actuator, Vehicle and Method of Integrating Vehicle.
Co-Pending U.S. Appl. No. 10/591,285, filed Aug. 31, 2006. Title: Riding Type Vehicle.
Co-Pending U.S. Appl. No. 10/591,560, filed Aug. 31, 2006. Title: Speed Change Controller for Straddle-Ride Type Vehicles.
Co-Pending U.S. Appl. No. 10/591,559, filed Aug. 31, 2006. Title: Shift Control Device for Straddle-Type Vehicle, and Straddle-Type Vehicle.
Co-Pending U.S. Appl. No. 10/591,284, filed Aug. 31, 2006. Title: Actuation Force Transmission Mechanism and Straddle-Type Vehicle.
EPO European Search Report for EP 06025981, completed Feb. 16, 2007.
EPO European Search Report for EP 06025877, completed Feb. 12, 2007.
EPO European Search Report for EP 06025734, completed Feb. 8, 2007.
EPO European Search Report for EP 06025732, completed Feb. 9, 2007.
EPO European Search Report for EP 06025609, completed Feb. 5, 2007.
EPO European Search Report for EP 06025607, completed Feb. 5, 2007.
EPO European Search Report for EP 06025606, completed Feb. 5, 2007.
European Search Report, Application No. EP 06025982, dated Feb. 6, 2007.

* cited by examiner

CLUTCH FAILURE DETECTOR, AUTOMATIC CLUTCH SYSTEM AND STRADDLE-TYPE VEHICLE

CROSS-REFERENCE TO RELATED APPLICATIONS

The present application is based on and claims priority under 35 U.S.C. § 119 to Japanese Patent Application No. 2006-048086, filed on Feb. 24, 2006, the entire contents of which is expressly incorporated by reference herein.

BACKGROUND OF THE INVENTION

1. Field of the Invention

The present invention relates generally to a clutch and, more specifically, to a clutch failure detection system.

2. Description of the Related Art

A two-wheeled motor vehicle, which has a friction clutch and a hydraulic automatic clutch system for automatically disengaging and engaging the friction clutch, is conventionally known. For example, in Japanese Patent Document JP-A-2003-329064, discloses a two-wheeled motor vehicle having an electric actuator and a hydraulic cylinder that together function as an automatic clutch system. In the disclosed system, the electric actuator is used to drive the hydraulic cylinder to disengage and engage the friction clutch. However, the hydraulic automatic clutch system can sometimes fail, which can result in potentially grievous consequences if the failure occurs undetected.

In order to meet such needs, a clutch failure system has been provided that includes a hydraulic sensor that can detect and monitor a pressure of hydraulic oil in order to detect a failure of the automatic clutch system.

However, the clutch failure system for detecting a failure of the automatic clutch system using a hydraulic sensor can result in a more complicated assembly process due to an additional step of installing the hydraulic sensor. Such a system can also require that sufficient space be available for installing the sensor. Oftentimes, a straddle-type vehicle, such as two-wheeled motor vehicle, can have severe spatial limitations for installing the hydraulic sensor and thereby render it difficult to secure an installation space. In addition, since the hydraulic sensor is physically installed, the installation area for the sensor must be sufficiently durable to permit such an installation.

Therefore, there is a need in the art for a detection system for detecting failure of the automatic clutch system. Implementation of such a system in a vehicle can improve the reliability of the automatic clutch system. Further, there is a need in the art for a clutch failure detector that has a relatively simple assembly and installation process. In addition, there is a need in the art for a clutch failure detector that is able to be easily installed in a typically small installation space for such a device. Furthermore, there is a need in the art for a durable and reliable clutch failure detector.

SUMMARY OF THE INVENTION

According to an aspect of the present invention, a clutch failure detector is provided for detecting failure of an automatic clutch system. The clutch system can include a friction clutch and an electric actuator for directly or indirectly disengaging and engaging the friction clutch. The clutch failure detector can include a current value detector and a determination device. The current value detector can be configured to detect a value of current supplied to the electric actuator of the automatic clutch system. The determination device can be configured to determine whether or not the automatic clutch system has a failure based on the detected valued of the current.

Therefore, failure detection for the automatic clutch system can be performed based on the value of the current supplied to the electric actuator for disengaging and engaging the friction clutch. For example, in a hydraulic automatic clutch system, hydraulic oil leakage in a driving mechanism between the actuator and the friction clutch can be detected as a change in current value for the actuator. Thus, failure of the automatic clutch system can be detected based on the change in the current value for the actuator. An additional benefit, according to an aspect of the present invention, is that the clutch failure detector may not require an additional step of installing a sensor, thereby simplifying its assembly process. In such a case, no space is needed for installing the sensor. Additionally, no problem arises with respect to durability of the installation area of the sensor.

Another aspect of the present invention comprises a method for detecting failure of an automatic clutch system that comprises a friction clutch and an electric actuator for disengaging and engaging the friction clutch. In the method, the electric actuator is activated to disengage or engage the friction clutch. While disengaging or engaging the friction clutch, an amount of current supplied to the electric actuator is detected Based at least in part on the detected amount of the current supplied to the electric motor, whether a failure has occurred in the automatic clutch system is determined.

BRIEF DESCRIPTION OF THE DRAWINGS

These and other features, aspects and advantages of the present invention will now be described in connection with a preferred embodiment of the invention, in reference to the accompanying drawings. The illustrated embodiment, however, is merely an example and is not intended to limit the invention. The drawings include the following nine figures.

DETAILED DESCRIPTION OF THE PREFERRED EMBODIMENTS

Figure 1:
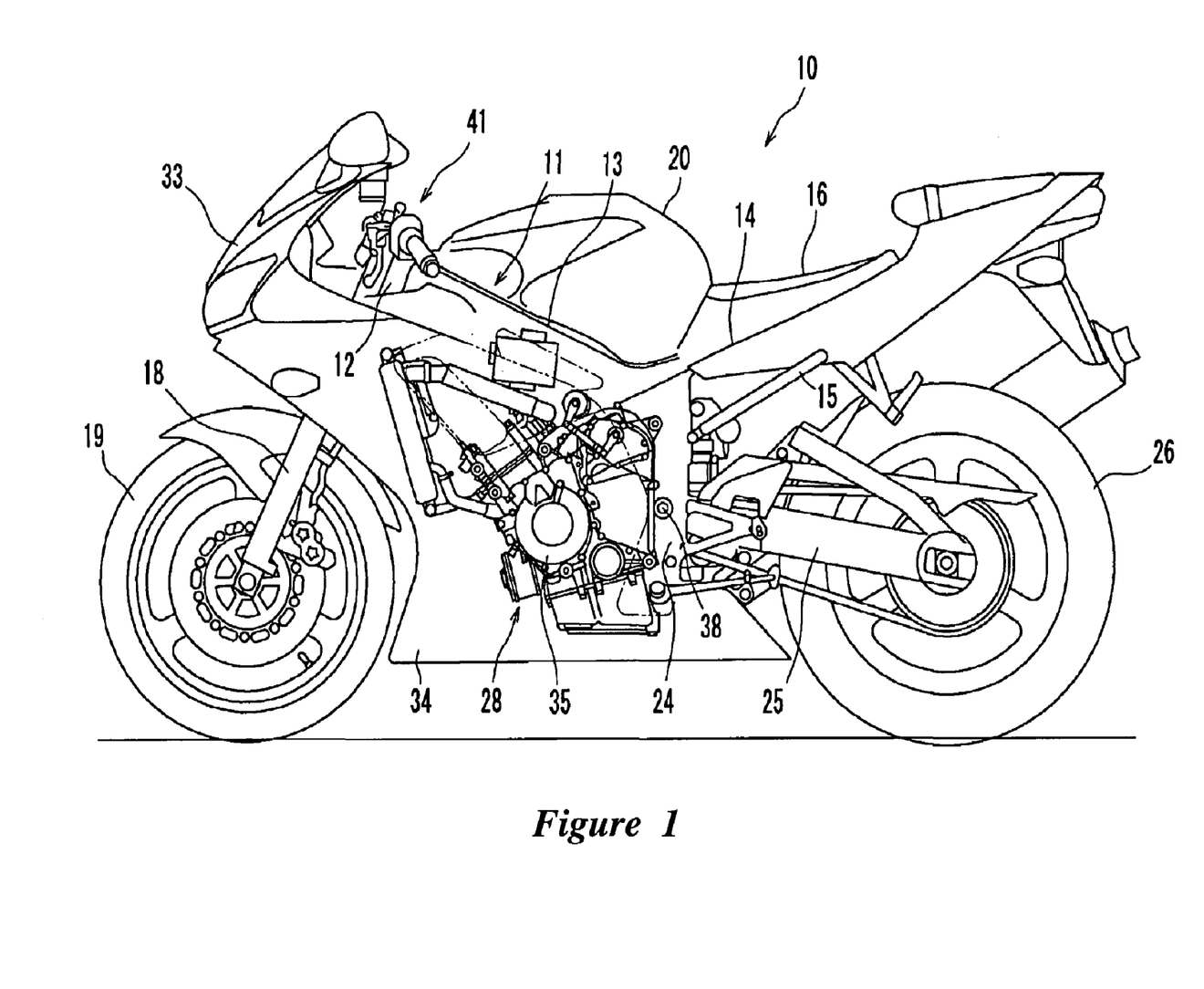
FIG. 1 is a side view of a two-wheeled motor vehicle according to one embodiment.

With reference now to the drawings wherein the figures are provided for purposes of illustrating preferred embodiments of the present invention and not for purposes of limiting the same, FIG. 1 illustrates a straddle-type vehicle fabricated according to an embodiment of the present invention, which vehicle is represented as a two-wheeled motor vehicle 10. As described further below, according to an aspect of the present invention, there is provided a clutch failure detector that can include a current value detector and a determination device. The current value detector can be configured to detect a value of current supplied to an electric actuator of an automatic clutch system. The determination device can be configured to determine whether or not the automatic clutch system has a failure based on the detected valued of the current.

The two-wheeled motor vehicle 10 can have a body frame 11 which can form the skeleton thereof and a seat 16 on which a rider can be seated. In use, the rider can be seated on the seat 16 and thereby straddle the body frame 11 in order to be properly positioned on the vehicle 10. Of course, the shape, characteristics, and attributes of the vehicle 10 are not limited to that shown in FIG. 1. The straddle-type vehicle can be a two-wheeled motor vehicle, often referred to as a motorcycle, which can have a fuel tank that is disposed in front of a seat. Also, the straddle-type vehicle is not limited to a two-wheeled motor vehicle 10, but can be a different straddle-type vehicle, such as a four-wheeled buggy.

In the following description, front, rear, right and left refer to the directions as viewed from a rider seated on the seat 16. The body frame 11 can have a steering head pipe 12, a main frame 13 extending rearward and obliquely downward from the steering head pipe 12, right and left seat rails 14 extending rearward and obliquely upward from an intermediate portion of the main frame 13, and right and left seat pillar tubes 15 each connected to the rear end of the main frame 13 and an intermediate portion of the corresponding seat rail 14.

A front wheel 19 can be supported by the steering head pipe 12 via a front fork 18. A fuel tank 20 and the seat 16 can be supported on the seat rails 14. The seat 16 can extend from a position on the fuel tank 20 toward the rear ends of the seat rails 14. The fuel tank 20 can be at least partially placed on the front halves of the seat rails 14.

A pair of right and left rear arm brackets 24 can be provided at the rear end of the main frame 13. Here, the rear arm brackets 24, as well as other members provided on the main frame 13 can form a part of the body frame 11.

The rear arm brackets 24 can protrude downward from the rear end of the main frame 13. The rear arm brackets 24 can have a pivot shaft 38, and the front end of a rear arm 25 can be swingably supported by the pivot shaft 38. A rear wheel 26 can be supported at the rear end of the rear arm 25.

An engine unit 28 for driving the rear wheel 26 can also be supported by the body frame 11. A crankcase 35 can be suspended from and supported by the main frame 13. In this embodiment, the engine unit 28 can have a gasoline engine (not shown). The engine of the engine unit 28 is not limited to an internal combustion engine, such as a gasoline engine, and can be a motor engine or the like.

The two-wheeled motor vehicle 10 can have a front cowling 33 and right and left leg shields 34. The leg shields 34 can cover members for covering front parts of the rider's legs.

A brake pedal can be provided at a lower right part of the two-wheeled motor vehicle 10, although not shown in FIG. 1. The brake pedal can be used to stop the rear wheel 26. The front wheel 19 can be stopped by operating a brake lever (not shown) provided in the vicinity of a right grip 41R (not shown) of handlebars 41.

Figure 2:
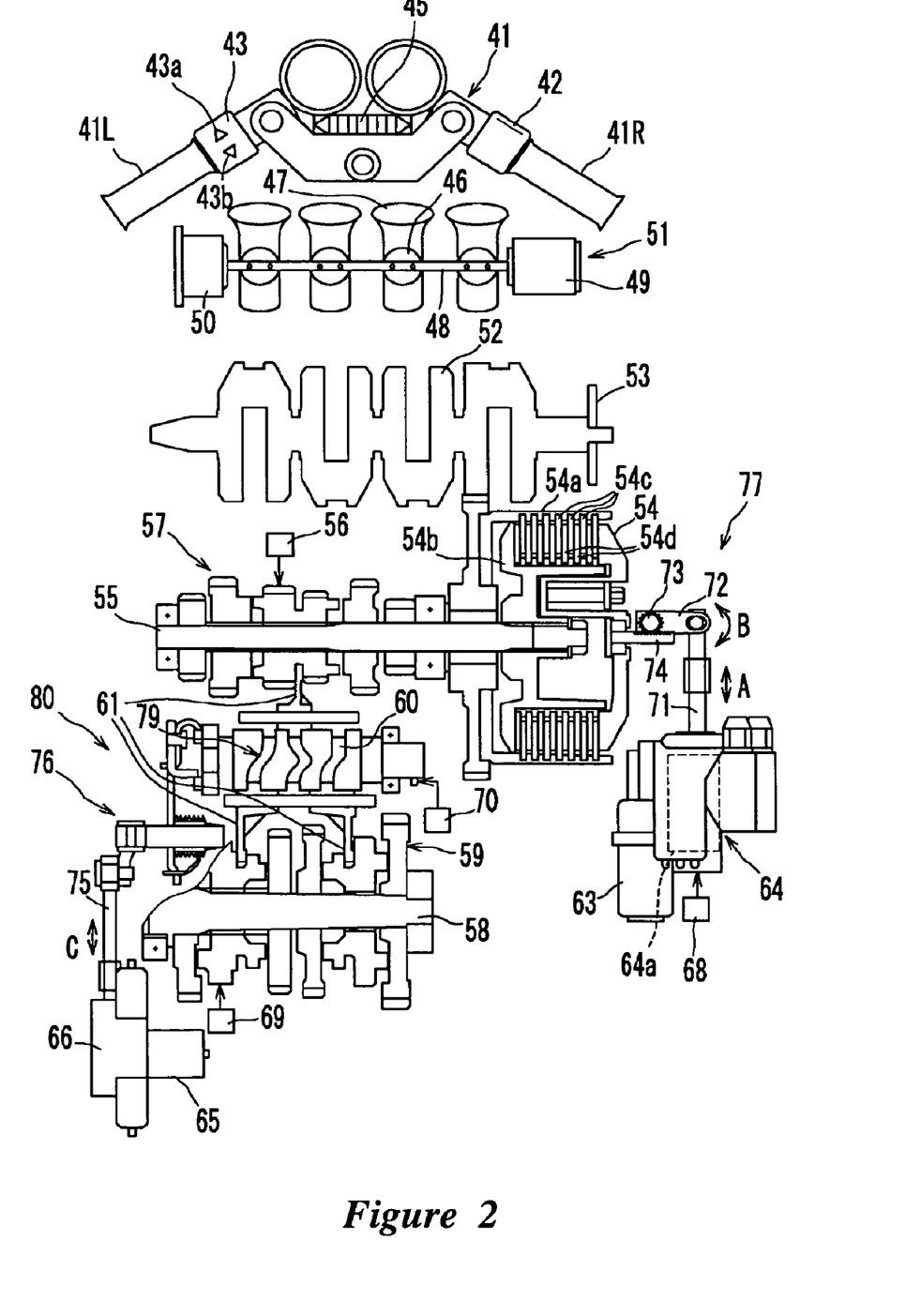
FIG. 2 is a configuration diagram of a driving system of the two-wheeled motor vehicle shown in FIG. 1.

FIG. 2 is a configuration diagram of an exemplary driving system that can be utilized in the two-wheeled motor vehicle 10 shown in FIG. 1. The right grip 41R of the handlebars 41 (shown also in FIG. 1) can be an accelerator grip, and a throttle input sensor 42 can be attached to the accelerator grip.

The throttle input sensor 42 can detect an accelerator input (throttle opening input) by the rider. A shift switch 43 can be provided on the side of the left grip 41L on the handlebars 41. The shift switch 43 can have a shift up switch 43a and a shift down switch 43b, and can change the shift position between neutral and top speed position (sixth gear speed in this embodiment) by manual operation to increase or decrease the speed. Also, an indicator 45 for indicating the current shift position can be provided at the center of the handlebars 41.

Throttle valves 46 can be attached to throttles 47 forming an air intake passage. A throttle driving actuator 49 can be provided at the right end of a valve shaft 48 for the throttle valves 46, and a throttle opening sensor 50 can be provided at the left end of the valve shaft 48. The throttle driving actuator 49 and the throttle opening sensor 50 can be attached to the valve shaft 48 and constitute a drive-by-wire 51 (hereinafter DBW 51). The DBW 51 can open or close the throttles 47 with the throttle driving actuator 49, depending on the results of detection by the throttle opening sensor 50.

An engine rotational speed sensor 53 can be provided at the right end of a crankshaft 52 and connected to the engine (not shown). The crankshaft 52 can be connected to a main shaft 55 via a wet multiple plate clutch 54. The clutch 54 can have a clutch housing 54a and a clutch boss 54b. A plurality of friction members, such as friction plates 54c can be attached to the clutch housing 54a, and a plurality of clutch plates 54d can be attached to the clutch boss 54b. Each of the clutch plates 54d can be placed between adjacent friction plates 54c. A plurality of shift gears 57 (six are shown in FIG. 2) can be mounted on the main shaft 55, and a main shaft rotational speed sensor 56 can be attached to the main shaft 55. The shift gears 57 mounted on the main shaft 55 can be in meshing engagement with shift gears 59 that can be mounted on a drive shaft 58, which is preferably disposed parallel to the main shaft 55. In FIG. 2, the shift gears 57 and the shift gears 59 are separated for convenience of explanation.

Both or either the shift gears 57 and/or the shift gears 59 can be mounted on the respective ones of the main shaft 55 and the drive shaft 58 in such a manner as to allow the gears to idle relative to each other, with the exception of a selected gear from each of the shift gears 57 and the shift gears 59. Therefore, transmission of driving force from the main shaft 55 to the drive shaft 58 can be made through a pairing of selected shift gears 57, 59.

The operation to select a shift gear 57 and a shift gear 59 for a gear change can be carried out by a shift cam 79. The shift cam 79 can have a plurality of cam grooves 60 (three are shown in FIG. 2), and a shift fork 61 can be received in each cam groove 60. Each shift fork 61 can be engaged with specific shift gears 57 and 59 of the respective ones of the main shaft 55 and the drive shaft 58. Each shift fork 61 engages with a dog assigned to each predetermined shift gear 57 and/or a predetermined drive shift gear 59 on the respective ones of the main shaft 55 and drive shaft 58. The dogs couple the gears to the shafts for rotation and are slideable along the shafts. Rotation of the shift cam 79 causes the shift fork 61 to move in an axial direction while being guided by the cam groove 60, whereby only a pair of the specific shift gears 57 and 59 at the position corresponding to the rotation angle of the shift cam 79 are spline fixed to the respective main shaft 41 and the drive shaft 42. The engagement of this specific pair of shift gears 57 and 59 can allow driving force to be transmitted from the main shaft 55 to the drive shaft 58. The shift gears 57 and 59, and the shift cam 79 can constitute a gearbox 80.

The clutch 54 and the gearbox 80 can be driven by an electric actuator, such as a clutch actuator 63, and a shift actuator 65, respectively. The clutch actuator 63 can be connected to the clutch 54 via a hydraulic pressure transmitter mechanism 64, a rod 71, a lever 72, a pinion 73 and a rack 74. The hydraulic pressure transmitter mechanism 64 can be a mechanism which has a hydraulic cylinder 64a, an oil tank (not shown), and other components as is known in the art, and which can be driven by the clutch actuator 63 to generate hydraulic pressure and transmit the hydraulic pressure to the rod 71. When the rod 71 is driven by the clutch actuator 63 to reciprocate as indicated by the arrow A, the lever 72 can rotate as indicated by the arrow B, whereby the clutch 54 can be engaged or disengaged depending on the moving direction of the rack 74. Although an electric motor can be employed as the clutch actuator 63 in this embodiment, the present invention is not limited thereto. For example, a solenoid or the like may be used. Also, an automatic clutch system 77 can be comprise the clutch 54, the clutch actuator 63, the hydraulic pressure transmitter mechanism 64, the rod 71, the lever 72, the pinion 73, the rack 74, and an electronic control unit 100 (hereinafter ECU 100) (see FIG. 3) for drive control of the clutch actuator 63. According to an aspect of the present invention, the automatic clutch need not be driven by the hydraulic pressure transmitter mechanism, but can be driven by a different transmission mechanism, such as lever, wire or rod, for example.

The shift actuator 65 can be connected to the shift cam 79 via the reduction mechanism 66, the rod 75 and the link mechanism 76. The reduction mechanism 66 can have a plurality of reduction gears (not shown). At the time of a gear change, the rod 75 can be driven by the shift actuator 65 to reciprocate as indicated by the arrow C, and the shift cam 79 can be rotated by a specific angle via the link mechanism 76. The shift forks 61 can thereby move axially a specific distance along the cam grooves 60, and a pair of shift gears 57 and 59 can engage each other and each be in fixed relation relative to the respective one of the main shaft 55 and the drive shaft 58. Then, driving force is transmitted from the main shaft 55 to the drive shaft 58 through the engagement of the gears 57 and 59. Although an electric motor can be employed as the shift actuator 65 in this embodiment, the present invention is not limited thereto. For example, a solenoid or the like may be used.

The hydraulic pressure transmitter mechanism 64 connected to the clutch actuator 63 can have a clutch position sensor 68 which can detect the stroke position of the piston to detect the clutch position. Also, a vehicle speed sensor 69 can be provided on the drive shaft 58. In addition, a gear position sensor 70 for detecting the gear position (the amount of rotation of the shift cam) can be provided on the shift cam 79.

A shift change can be carried out when the ECU 100 performs drive control of the clutch actuator 63 and the shift actuator 65 in response to an operation of the shift up switch 43a or the shift down switch 43b. More specifically, a series of operations takes place when the shift change is carried out: first, disengagement of the clutch 54 by the clutch actuator 63; then, gear change of the shift gears 57 and 59 by the shift actuator 65; and finally, engagement of the clutch 54 by the clutch actuator 63. This series of operations can be performed based on a specific program or map.

Figure 9:
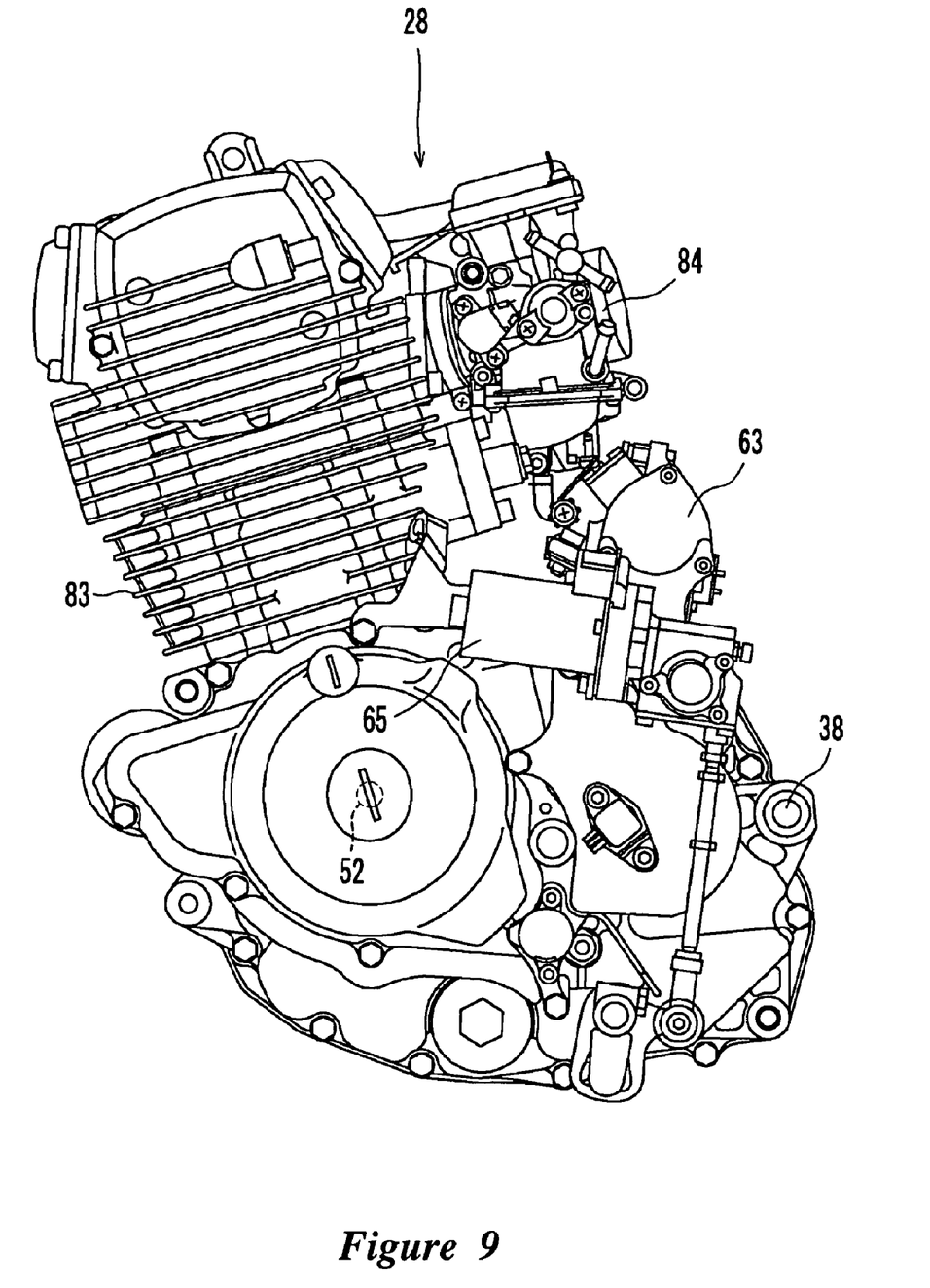
FIG. 9 is a side view showing the clutch actuator and a shift actuator mounted to an engine of the vehicle of FIG. 1.

As shown in FIG. 9, the clutch actuator 63 and the shift actuator 65 can be mounted to the crankcase 35 (see also FIG. 1). The clutch actuator 63 can be located behind the cylinder 83, and between the crankcase 35 and a carburetor 84 disposed above the crankcase 35. The shift actuator 65 can be disposed on the side of the upper portion of the crankcase 35 in a longitudinal direction of the vehicle, and located between the crankshaft 52 and the pivot shaft 38 (see also FIG. 1).

Figure 3:
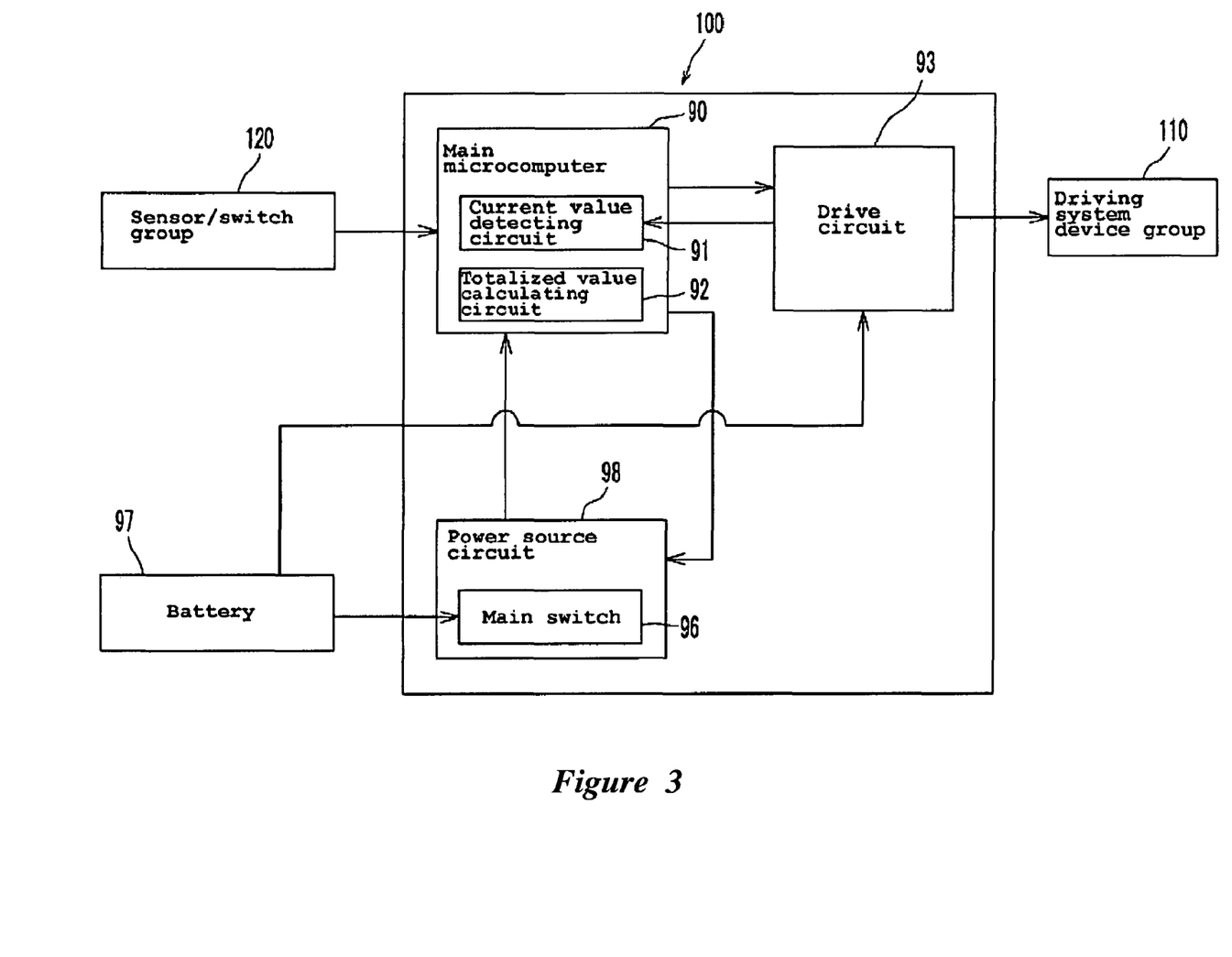
FIG. 3 is a block diagram illustrating a configuration of a control system of a clutch failure system on the two-wheeled motor vehicle.
Figure 4:
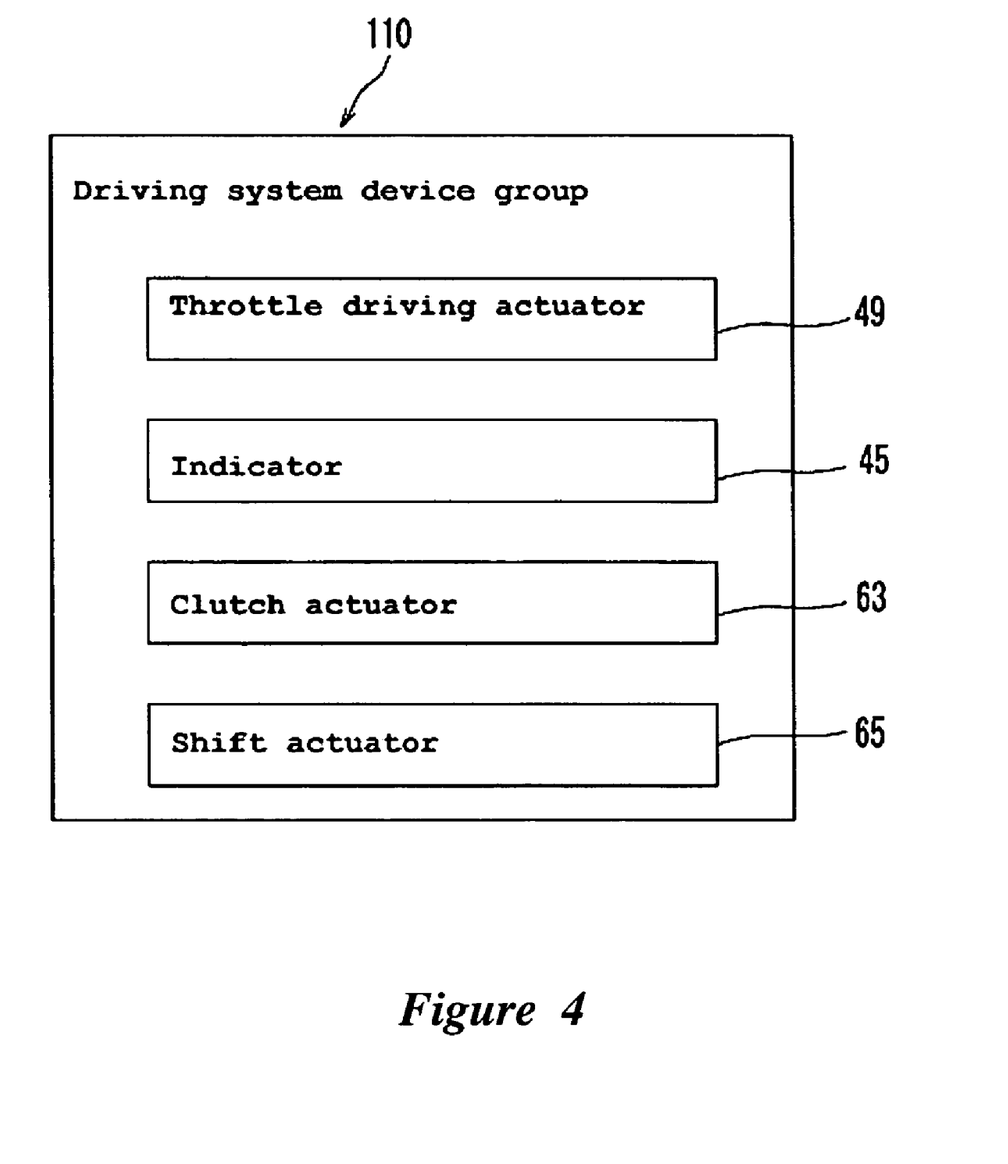
FIG. 4 is a block diagram illustrating a driving system device group.

FIG. 3 is a block diagram illustrating a configuration of a control system of a clutch system mounted on the two-wheeled motor vehicle 10 according to an aspect of the present invention. A driving system device group 110 can be connected to a main microcomputer 90 of the ECU 100 via a drive circuit 93. The ECU 100 can be considered to be the clutch failure detector, and the main microcomputer 90 can be considered to be the determination device, according to an aspect of the present invention. The driving system device group 110 can comprise the throttle driving actuator 49, the indicator 45, the clutch actuator 63 and the shift actuator 65 (see also FIG. 2) as shown in FIG. 4.

As will be described below, the ECU 100 can be designed as a feedback control device using the signals of various sensors described below. The ECU 100 preferably has the microcomputer 90 and some storage units which store various control maps defining relationships between parameters as will be described below. In addition, with respect to the control system various control circuits, units or groups will be described below. Such control circuits, units or groups and the ECU 100 can be in the form of a hard-wired circuit, a dedicated processor and memory, or a general purpose processor and memory running one or a plurality of control programs. For easier understanding of the reader, the circuit, units and groups will be described as if they were discriminate and substantial units. However, they can also be integrated parts or components of a larger system. In addition, various components are described as being "connected" to the ECU 100. It should be appreciated that this is a broad term that includes physical connections (e.g., electrical wires or hard wire circuits) and non-physical connections (e.g., radio or infrared signals). It should also be appreciated that "connected" includes direct connections and indirect connections (e.g., through additional intermediate device(s)).

The drive circuit 93 can supply appropriate current to the devices forming the driving system device group 110 from a battery 97 in response to a drive signal fed from the main microcomputer 90. In this embodiment, values of current supplied from the drive circuit 93 to drive the clutch actuator 63 can be fed-back to a current value detecting circuit 91. As shown in FIG. 3, the current value detecting circuit 91 can be included in the main microcomputer 90. The main microcomputer 90 can also include a totalized value calculating circuit 92. The totalized value calculating circuit 92 can calculate, based on the current values detected by the current value detecting circuit 91, a totalized current value for a specific period of time while the clutch 54 (see FIG. 2) is in the process of engaging by the clutch actuator 63. The main microcomputer 90 can include the current value detecting circuit 91 and the totalized value calculating circuit 92, which can each respectively serve as a current value detector and a totalized value calculator in this embodiment of the present invention.

Figure 5:
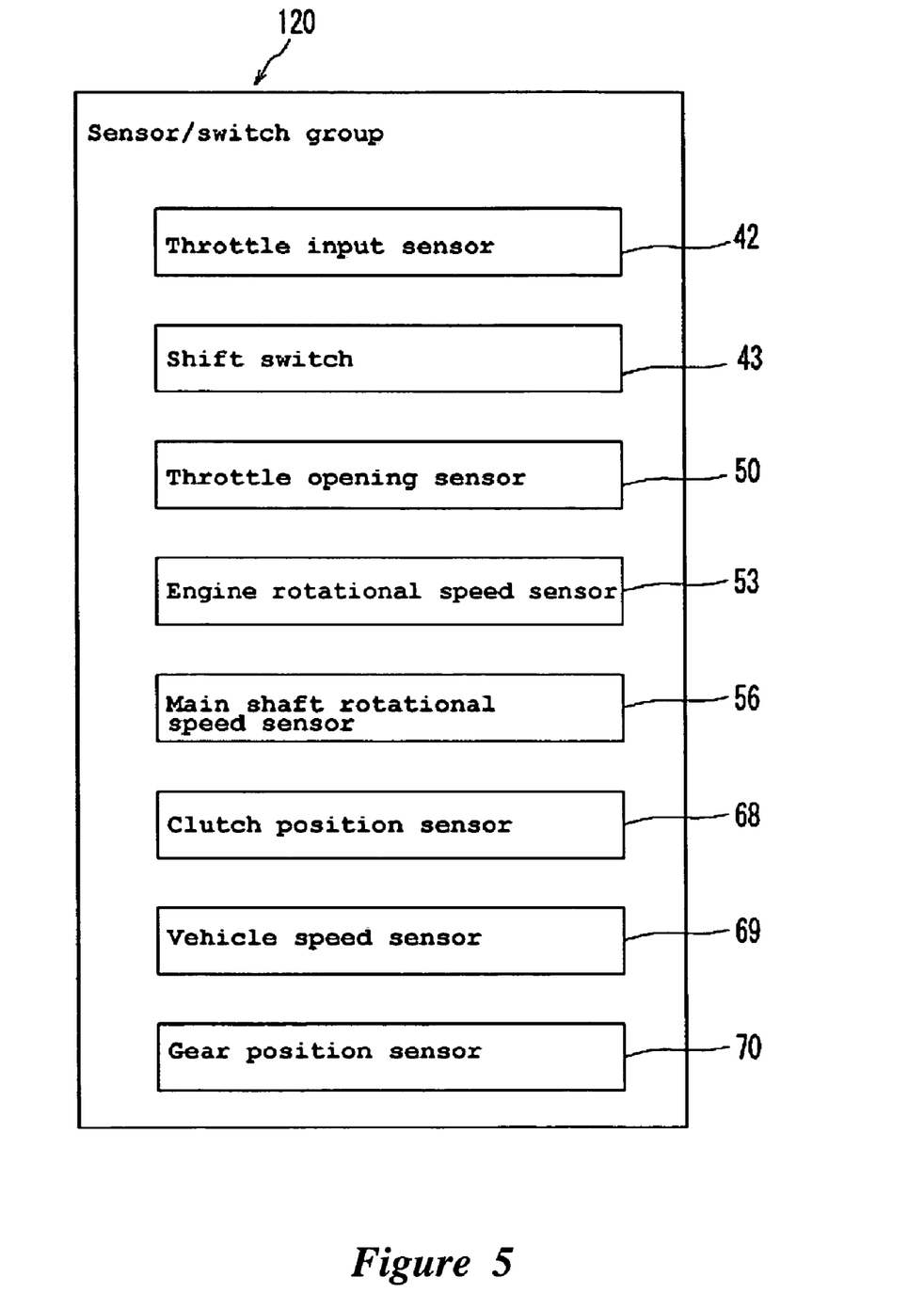
FIG. 5 is a block diagram illustrating a sensor/switch group.

A sensor/switch group 120 can also be connected to the main microcomputer 90. The sensor/switch group can comprise the throttle input sensor 42, the shift switch 43, the throttle opening sensor 50, the engine rotational speed sensor 53, the main shaft rotational speed sensor 56, the clutch position sensor 68, the vehicle speed sensor 69 and the gear position sensor 70, as shown in FIG. 5 (see also FIG. 2), and the results of detections by the sensors can be inputted into the main microcomputer 90. The main microcomputer 90 can feed drive signals to the devices which form the driving system device group 110 based on the results of detections received from the sensors to perform drive control of them.

A power source circuit 98 can be connected to the battery 97 and have a main switch 96 which can be switched on or off in synchronization with a key switch (not shown). When the main switch 96 is switched on, the power source circuit 98 can convert the voltage from the battery 97 into a voltage for driving the main microcomputer 90 and supplies it to the main microcomputer 90.

As mentioned above, the ECU 100 can be operative to detect a failure of the automatic clutch system 77. For example, when the two-wheeled motor vehicle 10 is stopped and the main switch 96 is turned ON, an operation to disengage and engage the clutch 54 can be executed experimentally for the purpose of failure detection for the automatic clutch system 77. Whether or not the automatic clutch system 77 has a failure can be determined based on the values of current supplied to the clutch actuator 63 during the experimental execution of the operation to disengage and engage the clutch 54. This process is described in greater detail below.

Figure 6:
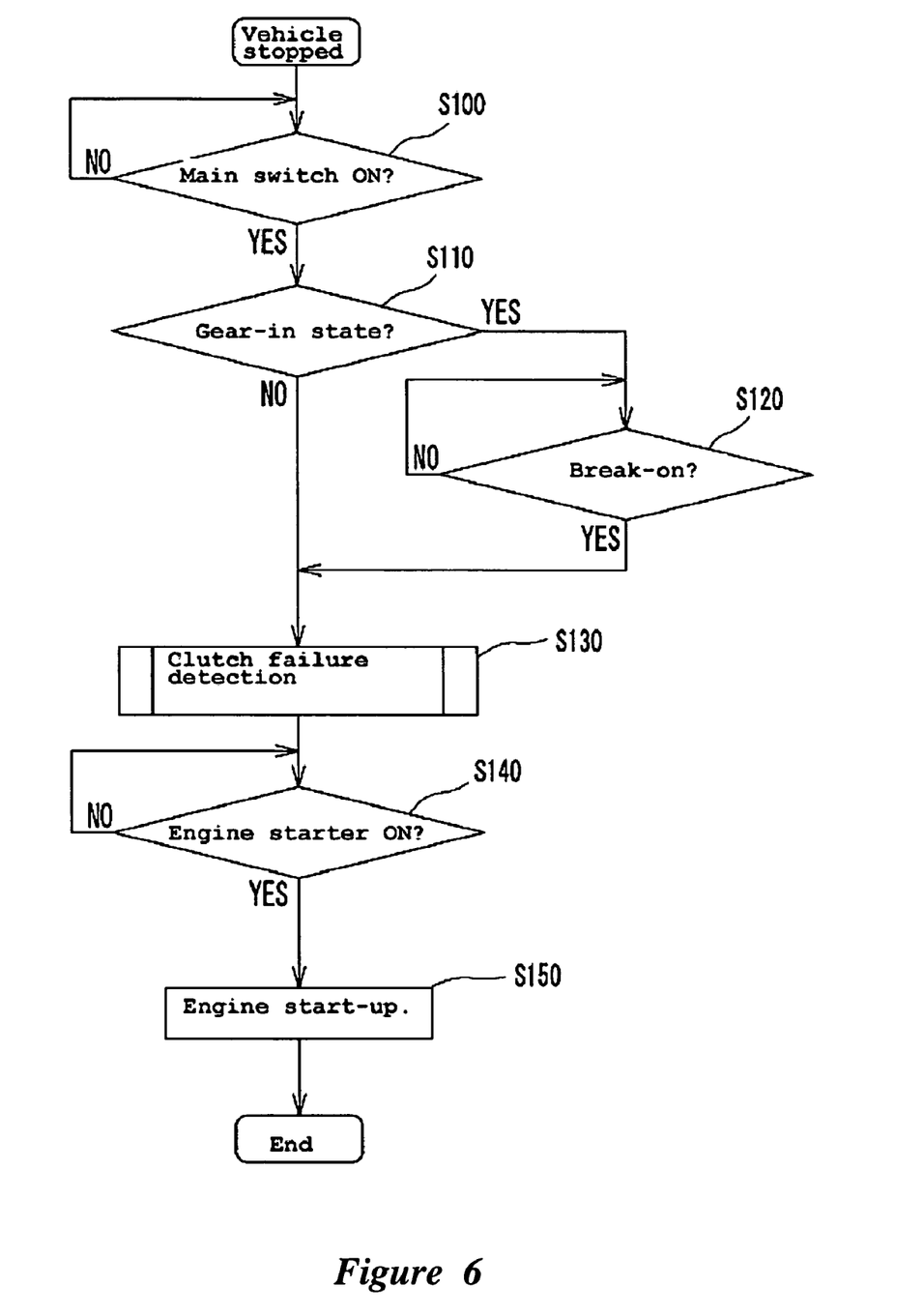
FIG. 6 is a flowchart illustrating steps of a process to be executed by an engine control unit (ECU) when the two-wheeled motor vehicle is stopped.

FIG. 6 is a flowchart illustrating a flow of a process which can be executed by the ECU 100 when the two-wheeled motor vehicle 10 is stopped. The engine can have an engine stop state at which the engine is maintained. For this purpose, a holding device can be provided that maintains the engine at the engine stop state. First, the ECU 100 can determine whether the main switch 96 is ON in a step S100. More specifically, upon an operation of a key switch (not shown) by a rider, the ECU 100 determines whether or not the main switch 96 is ON. If it is determined that the main switch 96 is not ON, the ECU 100 can loop the process to the step S100 until the main switch 96 is turned ON.

In turn, if it is determined that the main switch 96 is ON in the step S100, the ECU 100 can then determines whether the gearbox is in a gear-in state in a step S110. In this process, the ECU 100 can determine whether the gear position is in any one of the first to sixth speeds based on a detection signal from the gear position sensor 70. If it is determined that the gearbox is not in a gear-in state, that is, the gearbox is in neutral, the ECU can go to the process in a step S130, which is discussed later. In turn, if it is determined that the gearbox is in a gear-in state, the ECU 100 can then advance to a next step S120, in which the ECU 100 can determine whether a break-on operation has been executed. In this process, the ECU 100 can determine whether or not an operation of the break lever or the brake pedal has been executed.

If it is determined that the break-on operation has not been executed, the ECU 100 can loop the process to the step S120 until the break-on operation is executed. In turn, if it is determined that the break-on operation has been executed, a process to detect a clutch failure can then be performed in the step S130. This process can be performed regardless of a manual shift change by the rider. During this process, the operation to disengage and engage the clutch 54 can be performed. A failure in the automatic clutch system 77 can be determined based on the values of current supplied to the clutch actuator 63 while the clutch 54 is in the process of engaging in the operation to disengage and engage the clutch 54. Details of the process will be described later with reference to a figure (FIG. 7).

When the process in the step S130 is executed, the ECU 100 can next determine whether or not an engine starter has been ON in a step S140. In this process, the ECU 100 determines whether or not the engine starter (not shown) has been depressed. The process in the step S130 can be executed after the completion of the process in the step S120, as well as during the execution of the process in the step S120. If it is determined that the engine starter has not been ON, the ECU 100 can loop the process to the step S140 until the engine starter is turned ON. In turn, if it is determined that the engine starter has been ON, the engine can be started up in the process in a step S150 to end the subroutine. In accordance with an aspect of this embodiment, if the engine starter is depressed during the execution of the process to detect a clutch failure in the step S120, the ECU 100 can wait until the process in the step S130 is finished, and then allow the engine to start-up.

Figure 7:
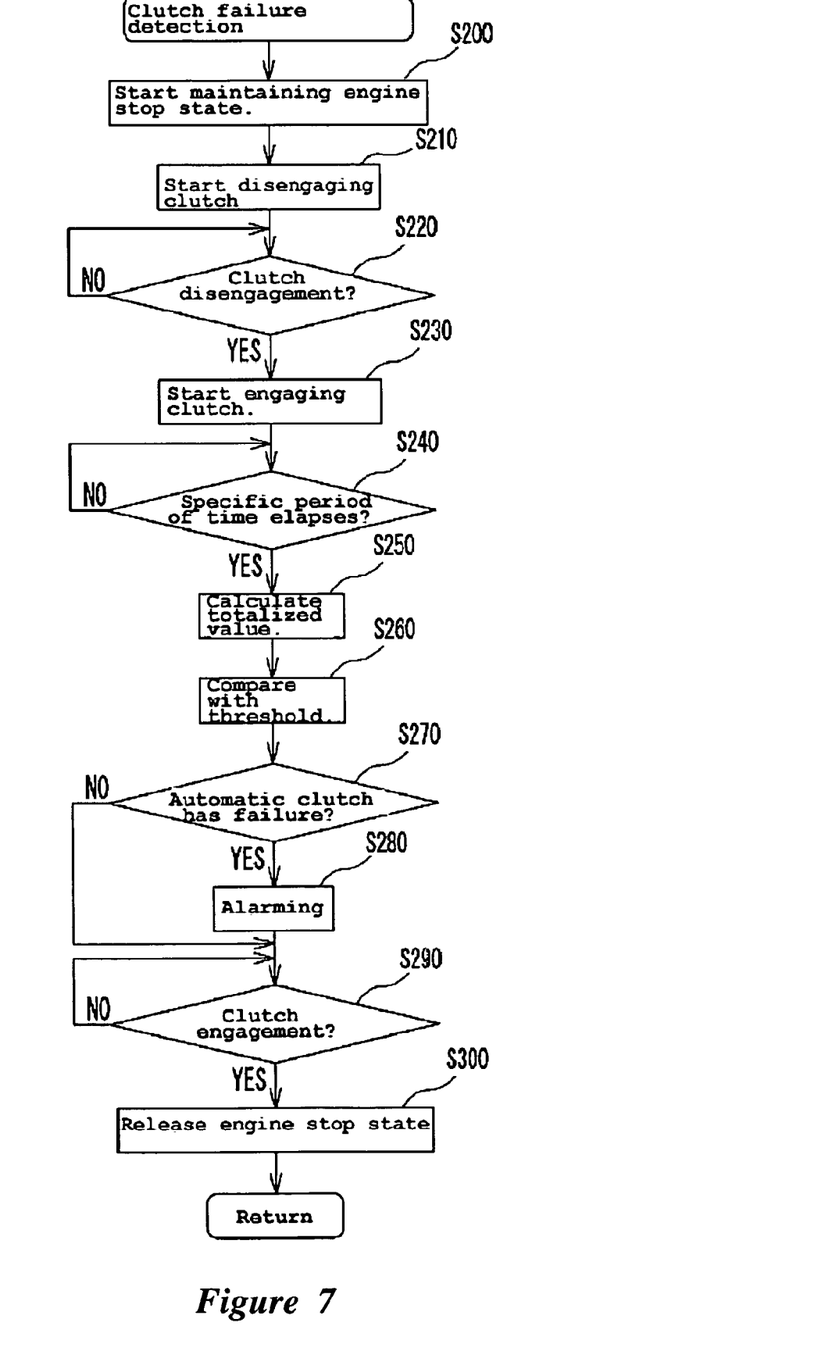
FIG. 7 is a flowchart illustrating steps of a subroutine called up in the process of FIG. 6 to detect a clutch failure.

FIG. 7 is a flowchart illustrating a flow of a process to detect a clutch failure, which can be called up in the step S130 in FIG. 6 and can be executed as a subroutine. The ECU 100 can start the process to detect a clutch failure with a first step related to engine start. In this step S130, the engine can be kept from starting. This step can be designed to hold the engine stationary even when the engine starter is ON.

Next, in a step S210, disengagement of the clutch can be started. In this step S210, the ECU 100 can start a process to disengage the clutch 54 at a constant speed by driving the clutch actuator 63. When the process in the step S210 is executed, step S220 can next determine whether or not disengagement of the clutch has been completed. In this step S220, the ECU 100 can determine whether or not the clutch 54 has been completely disengaged based on the results of detections received from the clutch position sensor 68 (see FIGS. 1 and 5). If it is determined that disengagement of the clutch has not been completed, the ECU 100 can loop the process to the step S220 until the clutch 54 is completely disengaged.

If it is determined that disengagement of the clutch has been completed in the step S220, engagement of the clutch can be started in a step S230. In this step S230, the ECU 100 can start a process to engage the clutch 54 at a constant speed by driving the clutch actuator 62. An engaging speed for the clutch 54 can be preset slower than a disengaging speed for the clutch 54 in the step S210.

When the process in the step S230 is executed, step S240 can next determine whether or not a specific period of time has elapsed. In this step S240, the ECU 100 can determine whether a preset specific period of time has elapsed since the start of the start of the engagement of the clutch in the step S230. If it is determined that the specific period of time has not elapsed, the ECU 100 can loop the process to the step S240 until the specific period of time has elapsed.

Once it is determined that the specific period of time has elapsed, step S250 can then calculate a totalized current value. In this step S250, the ECU 100 can calculate the totalized current value of current supplied to the clutch actuator 63. The totalized current value can include any current supplied to the clutch actuator 63 corresponding to the specific period of time in which the clutch 54 is in the process of engaging. In this regard, the value of the current supplied to the clutch actuator 63 can be detected by the current value detecting circuit 91 at given timing intervals and can be stored to a memory (not shown) or the like. Based on the detection results, the totalized current calculating circuit 92 can calculate the totalized current value for the specific period of time since the start of the engagement of the clutch in the step S230.

When the process in the step S250 is executed, step S260 can compare the totalized current value provided by the process in the step S250 with a threshold to provide a comparison result. The threshold can be stored in advance in the memory of the ECU 100. The threshold can be calculated in advance by examining values of current supplied to the clutch actuator 63 during normal operation of the automatic clutch system 77 (i.e. when the automatic clutch system 77 is working properly).

When the process in the step S260 is executed, step S270 can determine whether a failure has occurred in the automatic clutch system 77. This determination can be made based on the comparison result provided by the process in the step S260. More specifically, if a difference between the totalized current value provided by the process in the step S250 and the threshold is equal to or greater than a specific value, it is determined that the automatic clutch system 77 has had a failure (e.g. hydraulic oil leakage). When it is determined that the automatic clutch system 77 has had a failure, the driver can be informed of the failure with any alarm (e.g. the indicator shown in FIG. 1) in a step S280. This can allow the rider to immediately know the occurrence of a failure of the automatic clutch system 77. The alarm is not limited to the indicator, but can be any device that can inform the driver of the failure. For example, a sound generator for generating sounds, as well as a uniquely configured igniter and a fuel injector that alert the driver of the failure using changes in engine power output, can be used.

After the process in the step S280 is executed, or after it is determined that the automatic clutch system 77 has no failure in the step S270, step S290 can then determine whether the engagement of the clutch 54 has been completed. In this process, the ECU 100 can determine whether or not the clutch 54 has been completely engaged based on the results of detections received from the clutch position sensor 68. If it is determined that engagement of the clutch 54 has not been completed, the ECU 100 can loop the process to the step S290 until the clutch 54 is completely engaged. When it is determined that the clutch 54 has been completely engaged, the engine stop state in the process in the step S200 can be released in a step S300. Upon performing the process in the step S300, the engine starter can be turned ON and the engine can then start-up. When the process in the step S300 is executed, the process to detect a clutch failure can be ended.

Figure 8:
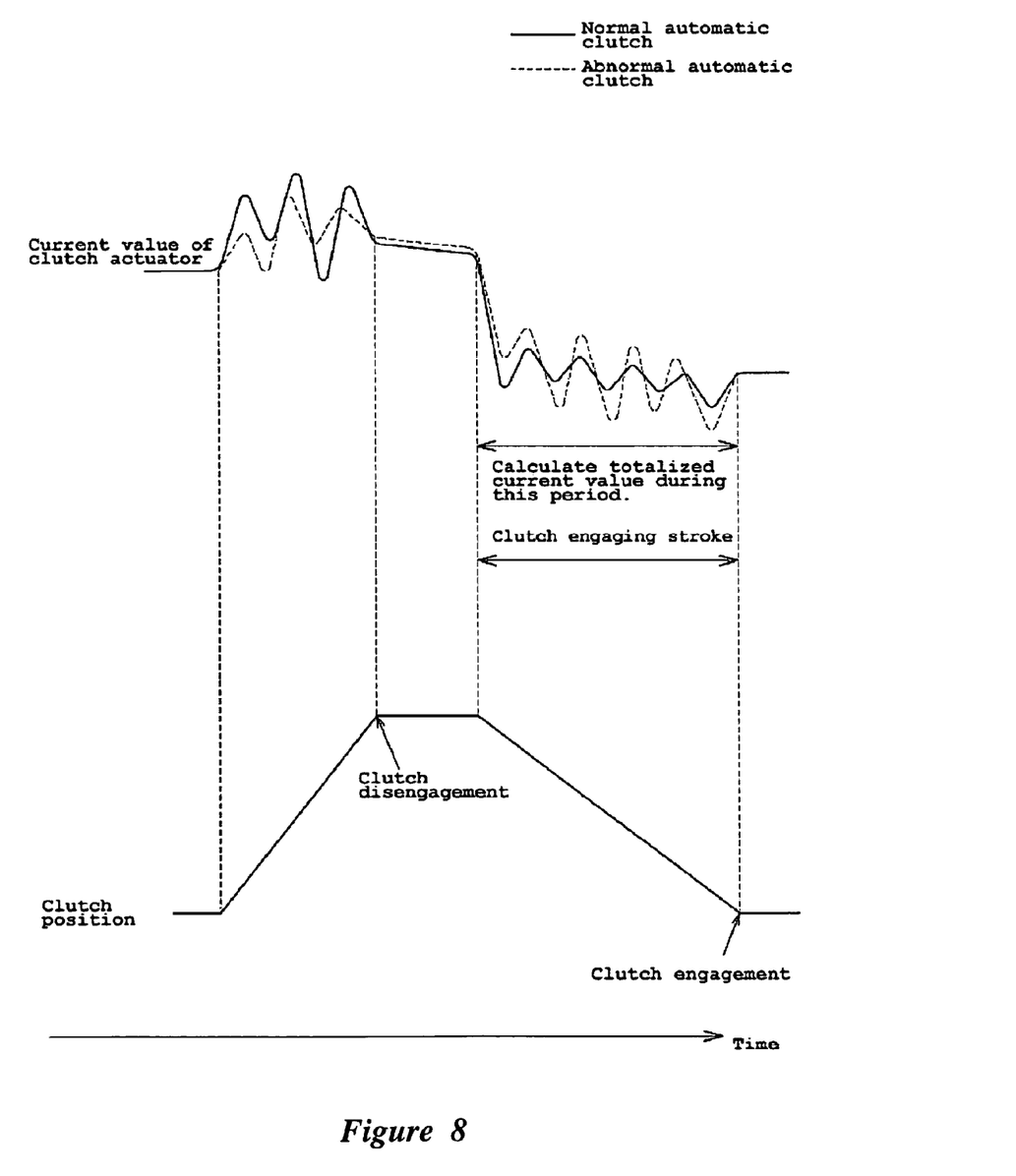
FIG. 8 illustrates characteristics of values of current supplied to a clutch actuator during an operation to disengage and engage a clutch.

FIG. 8 illustrates characteristics of values of current supplied to the clutch actuator 63 during an operation to disengage and engage the clutch 54, according to an aspect of the present invention. FIG. 8 shows a clutch position during the operation to disengage and engage the clutch 54. As shown in the figure, the engaging speed for the clutch 54 can be slower than the disengaging speed for the clutch 54 during the normal operation to disengage and engage the clutch 54. FIG. 8 also shows two patterns of values of current supplied to the clutch actuator 63 during the operation to disengage and engage the clutch 54. The solid line is representative of a current value during proper functioning of the automatic clutch system 77 whereas the broken line is representative of a current value when there is a failure in any of components in the automatic clutch system 77.

In this embodiment, a totalized value of current supplied to the clutch actuator 63 can be calculated over a whole period of the engagement stroke of the clutch 54, as indicated in FIG. 8. Using only a current value at any single point for comparison purpose may not be accurate enough to determine whether or not the automatic clutch system 77 has a failure, in view of the characteristics of the two patterns of current values for the clutch actuator 63 shown in FIG. 8. Therefore, a totalized current value for a specific period of time can be used for comparison in this embodiment, which clearly shows differences in totalized value between normal and abnormal conditions of the automatic clutch system 77.

As described above, in the two-wheeled motor vehicle 10 according to this embodiment, a failure of the automatic clutch system 77 can be detected based on the values of current supplied to the clutch actuator 63 during the operation to disengage and engage the clutch 54. Thus, in accordance with an aspect of the present invention, no separate sensor (e.g. torque sensor or hydraulic sensor) may be required for detecting a failure of the automatic clutch system 77. Consequently, any additional step requiring installation of such a sensor can be eliminated and thereby ensure that the manufacturing process is largely uncomplicated. In addition, no space is needed for installing the sensor. Further, if no sensor is needed, no problem arises with respect to durability of the installation area.

In the two-wheeled motor vehicle 10 according to this embodiment, a totalized current value over a specific period of time can be calculated to compare this totalized value with the preset threshold in order to determine whether the automatic clutch system 77 has a failure. At this time, the values of current supplied to the clutch actuator 63 in operation can be fed-back to the main microcomputer 90 to totalize the current values. Thus, any failure of the automatic clutch system 77 can be more accurately determined. In other words, it may be difficult to determine the presence or absence of a failure by only comparing a current value at a single point with the threshold. However, using a totalized value for such comparison can give clear differences in current value between the normal and abnormal conditions. Therefore, the accuracy of the determination of whether the automatic clutch system 77 has a failure can be enhanced.

As previously noted, in this embodiment, based on the totalized current value for a specific period of time, a specific quantity of energy needed for disengaging and engaging the clutch 54 can be detected. The detected energy quantity can be compared with a prescribed energy quantity, and based on a difference between this comparison, failure of the automatic clutch system 77 can be detected. Since the failure detection for the automatic clutch system 77 can be based on a readily detectable physical quantity and/or energy quantity, the accuracy for detecting a failure of the automatic clutch system 77 can be improved.

Also, in accordance with an aspect of this embodiment, failure detection can be performed based on a totalized current value, which can be specifically provided while the clutch 54 is in the process of engaging. As described above, the engaging speed for the clutch 54 can generally be slower than the disengaging speed. Thus, according to this embodiment, current values can be detected more accurately and readily, which further enhances the accuracy for detecting a failure of the automatic clutch system 77.

In accordance with another aspect of this embodiment, and as shown in FIG. 2, the automatic clutch system 77 can include the electric clutch actuator 63 and the hydraulic pressure transmitting mechanism 64. The hydraulic pressure transmitting mechanism 64 can include the hydraulic cylinder 64a. This can allow the hydraulic pressure transmitting mechanism 64 to amplify driving force for the clutch actuator 63. Thus, the operation to disengage and engage the clutch 54, which can require a relatively large driving force, can be performed smoothly. Therefore, detection of current values for the purpose of failure determination and smooth disengagement and engagement of the clutch 54 can both be achieved. In addition, a relatively small motor can be utilized as the clutch actuator 63. The mechanism for amplifying driving force for the clutch actuator 63 is not limited to the hydraulic pressure transmitting mechanism 64 having the hydraulic cylinder 64a; an alternative mechanism can also be used. For example, a mechanism can be used that has a different type of fluid pressure cylinder, such as other than the hydraulic cylinder. In addition, other mechanisms for amplifying the driving force could also be used, such as, for example, levers, gears and the like.

In accordance with another aspect of this embodiment, the clutch 54 can be a wet multiple plate clutch. Indeed, this type clutch can have a limited space for installing a torque sensor or a hydraulic sensor, and can tend to require a more complicated assembly of the sensor. However, a wet multiple plate clutch can nevertheless be used because the configuration of the embodiment discussed herein does not require a sensor. Regardless, the clutch is not limited to a wet multiple plate clutch; instead, a dry clutch or a single plate clutch can also be used.

According to yet another aspect of this embodiment, the clutch actuator 63 can be formed by the electric motor. This can provide easy and accurate detection of values of current supplied to the clutch actuator 63.

In accordance with another aspect of this embodiment, as shown in FIG. 6, when the gearbox is in neutral, the operation to disengage and engage the clutch 54 can be performed upon turning on the main switch 96. During the operation to disengage and engage the clutch 54, failure detection for the automatic clutch system 77 can be implemented. More specifically, when the vehicles is stopped, the operation to disengage and engage the clutch 54 can be performed during a period between when the main switch 96 is turned ON and when the engine is started up. Further, this operation can be performed without requiring any manual operation by the rider. During this period, failure detection for the automatic clutch system 77 can be implemented. This allows the rider to make sure that the automatic clutch system 77 functions properly prior to driving the two-wheeled motor vehicle 10. In addition, failure detection can be automatically performed every time the user rides the two-wheeled motor vehicle 10. This eliminates the possibility of the user failing to give an instruction to perform failure detection, which, if the user if forgetful, can result in no failure detection being performed over a long period time.

In accordance with yet another aspect of this embodiment, if the main switch 96 is turned ON with the gearbox in a gear-in state, then the operation to disengage and engage the clutch 54 can be performed upon the break-on operation. During this operation, failure detection for the automatic clutch system 77 can be implemented. However, when the vehicle is stopped on a sloping road with the gearbox in a gear-in state, and the operation to disengage and engage the clutch 54 is performed, the vehicle can move at the time of disengaging the clutch 54. Thus, in order to prevent such movement, as described in this embodiment, the ECU 100 can wait until the brake-on operation is executed and then begin the operation to disengage and engage the clutch 54. Thus, any movement of the vehicle during the failure detection can be prevented.

In addition, according to yet another aspect of this embodiment, the engine can be kept from running during the operation to disengage and engage the clutch 54. It is contemplated that by performing the failure detection prior to starting the engine, the failure detection can be implemented in a safe manner.

According to another aspect of this embodiment, in the case that the engine starter is turned ON during the operation to disengage and engage the clutch 54, the engine can be kept from starting while this operation is performed. Once the operation is completed, the engine can be started up. Thus, even when the engine starter is turned ON during the operation to disengage and engage the clutch 54, such turning ON of the engine starter is not cancelled. Indeed, although there can be a slight time lag between when the engine starter is turned ON and when the engine is started up, the series of operations from turning the main switch 96 ON to starting up the engine can be performed smoothly. This can reduce the possibility of harm to the user.

As described in the aforementioned embodiment, after the main switch 96 is turned ON, the operation to disengage and engage the clutch 54 can be performed without requiring any manual operation by the rider. Also, during this operation, failure detection for the automatic clutch system 77 can be implemented. However, in accordance with another aspect of the present invention, failure detection for the automatic clutch system 77 can also be implemented during an operation to disengage and engage the clutch 54 that is intended for normal shift changes. In other words, the process of failure detection can be performed not only while the engine is stopped, but also while the engine is running and the vehicle is in use. More specifically, the failure detection can be performed during the operation to disengage and engage the clutch 54 that is intended for shift changes, in response to the operation of the shift up switch 43a or the shift down switch 43b (See FIG. 2).

In addition, as described in the aforementioned embodiment, a totalized value of current supplied to the clutch actuator 63 can be calculated for a specific period of time while the clutch 54 is in the process of engaging. However, in accordance with another implementation of the embodiment of the present invention, the totalized value can also be calculated while the clutch 54 is in the process of disengaging.

As described in the aforementioned embodiment, a totalized current value can be calculated over a whole period of the engagement stroke of the clutch 54. However, it is also contemplated that the totalized value may not necessarily calculated over the whole period, but that the totalized value can be calculated over only a part of the period of the engagement stroke of the clutch 54. Similarly, as mentioned above, the totalized current value can be calculated over any period of the disengagement stroke of the clutch 54.

In order to reduce the time necessary for failure detection, the disengagement stroke of the clutch 54 can be shortened compared to the disengagement stroke for normal gear changes. More specifically, in the operation to disengage and engage the clutch 54 for normal gear changes, the shift actuator 63 can be controlled such that the friction plates 54c and the clutch plates 54d are spaced from each other by a specific distance. However, in the operation to disengage and engage the clutch 54 for failure detection, the shift actuator 63 can be controlled such that the friction plates 54c and the clutch plates 54d are spaced from each other by a distance shorter than specific distance at which the plates 54c, 54d are space for normal gear changes. Thus, the time duration needed for disengaging and engaging the clutch 54 for failure detection can be shortened, which can result in prompt failure detection.

Although an embodiment of the present invention has been disclosed in the context of certain illustrations and examples, it will be understood by those skilled in the art that the teachings herein extend beyond the specifically disclosed embodiment to other alternative embodiments and/or uses of the embodiments and obvious modifications and equivalents thereof. In addition, while several variations of the embodiment have been shown and described in detail, other modifications, which are within the scope of this embodiment, will be readily apparent to those of skill in the art based upon this disclosure. It is also contemplated that various combinations or sub-combinations of specific features and aspects of the embodiment can be made and still fall within the scope of the teachings herein. It should be understood that various features and aspects of the disclosed embodiment can be combined with or substituted for one another in order to form varying modes of the disclosed embodiments. For example, in the various methods and routines described above certain steps or procedures can be modified, rearranged, combined and/or eliminated. Thus, it is intended that the scope of the present embodiment herein disclosed should not be limited by the particular disclosed embodiments described above.

What is claimed is:

1. A clutch failure detector for detecting a failure of an automatic clutch system, the clutch system having a friction clutch and an electric actuator for disengaging and engaging the friction clutch, the failure detector comprising:
   a current value detector for detecting a value of current supplied to the actuator; and
   a determination device for determining whether or not the automatic clutch system has a failure based on the value of the current detected by the current value detector.

2. The clutch failure detector according to claim 1, further comprising a totalized value calculator for calculating a totalized current value detected by the current value detector, the determination device comparing a preset threshold with the totalized current value for a specific period of time, the specific period of time being during an operation to disengage and engage the friction clutch.

3. The clutch failure detector according to claim 2, wherein the specific period of time is while the friction clutch is in the process of engaging.

4. An automatic clutch system comprising:
   a friction clutch;
   an electric actuator for disengaging and engaging the friction clutch; and
   a drive control unit for drive control of the actuator; and
   a clutch failure detector for detecting a failure of the clutch system, the failure detector including:
      a current value detector for detecting a value of current supplied to the actuator; and
      a determination device for determining whether or not the automatic clutch system has a failure based on the value of the current detected by the current value detector.

5. The automatic clutch system according to claim 4, wherein the friction clutch is a wet multiple plate clutch.

6. The automatic clutch system according to claim 4, wherein the actuator is a motor.

7. A straddle-type vehicle comprising:
   an automatic clutch system including a friction clutch, an electric actuator, a drive control unit, and a clutch failure detector, the electric actuator being operative to disengage and engage the friction clutch, the drive control unit being operative to provide drive control of the actuator, the clutch failure being operative to detect a failure of the clutch system, the failure detector including:
      a current value detector for detecting a value of current supplied to the actuator; and
      a determination device for determining whether or not the automatic clutch system has a failure based on the value of the current detected by the current value detector.

8. The straddle-type vehicle according to claim 7, further comprising:
   a power source system for supplying power;
   a main switch having ON and OFF states for controlling the power from the power source system; and
   an engine;
   wherein the drive control unit drives the actuator in response to the ON state of the main switch, and the clutch failure detector performs failure determination based on the current value for the actuator.

9. The straddle-type vehicle according to claim 7, further comprising:
   a power source system for supplying power;
   a main switch having ON and OFF states for controlling the power from the power source system; and
   an engine;
   wherein the drive control unit drives the actuator in response to the ON state of the main switch to perform the operation to disengage and engage the friction clutch, and the clutch failure detector performs failure determination for the automatic clutch system while the friction clutch is in the process of engaging.

10. The straddle-type vehicle according to claim 7, further comprising:
    a power source system for supplying power;
    a main switch having ON and OFF states for controlling the power from the power source system; and
    an engine;
    wherein in response to the ON state of the main switch, the drive control unit drives the actuator prior to a start-up of the engine, and the clutch failure detector performs failure determination based on the current value for the actuator.

11. The straddle-type vehicle according to claim 7, further comprising:
    a power source system for supplying power;
    a main switch having ON and OFF states for controlling the power from the power source system; and
    a gearbox,
    wherein when the gearbox is in neutral, the drive control unit drives the actuator in response to the ON state of the main switch to perform the operation to disengage and engage the friction clutch, and the clutch failure detector performs failure detection for the automatic clutch system while the friction clutch is in the process of engaging.

12. The straddle-type vehicle according to claim 7, further comprising:
    a power source system for supplying power;
    a main switch having ON and OFF states for controlling the power from the power source system; and
    a gearbox, and
    a break,
    wherein with the main switch in the ON state and with the gearbox in a gear-in state, the drive control unit drives the actuator upon a break-on operation to perform the operation to disengage and engage the friction clutch, and the clutch failure detector performs failure detection for the automatic clutch system while the friction clutch is in the process of engaging.

13. The straddle-type vehicle according to claim 7, further comprising an alarm for informing that the clutch failure detector has detected a failure of the automatic clutch system.

14. The straddle-type vehicle according to claim 7, further comprising a gearbox, wherein the friction clutch has first and second friction members being separate from each other and operative to contact each other for engaging the clutch, the drive control unit being configured to allow the friction members to be spaced apart by a specific distance during gear changes of the gearbox and to be spaced apart by a distance shorter than the specific distance during the failure determination.

15. The straddle-type vehicle according to claim 10, further comprising a holding device for holding an engine stop state while the operation to disengage and engage the friction clutch is performed by the drive control unit.

16. The straddle-type vehicle according to claim 15, further comprising an engine starter that starts up the engine automatically after the operation to disengage and engage the friction clutch is ended.

17. A method for detecting failure of an automatic clutch system that comprises a friction clutch and an electric actuator for disengaging and engaging the friction clutch, the method comprising:

activating the electric actuator to disengage or engage the friction clutch;

while disengaging or engaging the friction clutch, detecting an amount of current supplied to the electric actuator; and based at least in part on the detected amount of the current supplied to the electric motor, determining whether a failure has occurred in the automatic clutch system.

18. The method of claim 17 wherein detecting an amount of current supplied to the electric actuator comprises sensing the amount of current supplied to the electric actuator only while engaging the friction clutch.

19. The method of claim 17 wherein determining whether failure has occurred in the automatic clutch system comprises calculating a totalized amount of current supplied to the electric actuator during a period of time.

20. The method of claim 19, wherein determining whether failure has occurred in the automatic clutch system comprises comparing the totalized amount of current to a threshold value.

21. The method of claim 17 activating the electric actuator to disengage or engage the friction clutch comprises activating a hydraulic device.

* * * * *